US008832421B2

(12) United States Patent
Salomone et al.

(10) Patent No.: US 8,832,421 B2
(45) Date of Patent: Sep. 9, 2014

(54) ENHANCED FAST RESET IN MOBILE WIRELESS COMMUNICATION DEVICES AND ASSOCIATED METHODS

(75) Inventors: Leonardo José Silva Salomone, Nepean (CA); Jerry E. Mailloux, Waterloo (CA); David Paul Yach, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 21 days.

(21) Appl. No.: 12/907,366

(22) Filed: Oct. 19, 2010

(65) Prior Publication Data

US 2011/0143809 A1    Jun. 16, 2011

Related U.S. Application Data

(60) Provisional application No. 61/253,112, filed on Oct. 20, 2009.

(51) Int. Cl.
G06F 9/00     (2006.01)
G06F 15/177   (2006.01)
G06F 1/24     (2006.01)
G06F 9/44     (2006.01)

(52) U.S. Cl.
CPC ............. G06F 1/24 (2013.01); G06F 9/4401 (2013.01)
USPC .................................. 713/2; 713/1; 455/418

(58) Field of Classification Search
USPC ......... 713/1, 2, 300, 310, 320, 321–324, 330, 713/340; 455/550.1, 418, 423, 425, 556.1, 455/556.2, 557, 566; 345/87–90, 156
See application file for complete search history.

(56) References Cited

U.S. PATENT DOCUMENTS

| 5,935,242 | A | * | 8/1999 | Madany et al. | 713/1 |
| 6,098,158 | A | * | 8/2000 | Lay et al. | 711/162 |
| 6,154,838 | A | | 11/2000 | Le et al. | 713/2 |
| 6,678,712 | B1 | | 1/2004 | McLaren et al. | |
| 6,795,966 | B1 | | 9/2004 | Lim et al. | |
| 7,489,923 | B2 | | 2/2009 | Varanda | 455/418 |
| 8,239,667 | B2 | * | 8/2012 | Durham | 713/100 |
| 2003/0160769 | A1 | * | 8/2003 | Numano | 345/173 |
| 2005/0144498 | A1 | * | 6/2005 | Lin | 713/600 |
| 2007/0032228 | A1 | | 2/2007 | Varanda | 455/418 |
| 2007/0106483 | A1 | * | 5/2007 | Kelley et al. | 702/141 |
| 2008/0189538 | A1 | * | 8/2008 | King et al. | 713/1 |
| 2008/0263350 | A1 | * | 10/2008 | Haverkamp et al. | 713/2 |
| 2009/0017903 | A1 | * | 1/2009 | Mizoguchi et al. | 463/20 |
| 2009/0054045 | A1 | | 2/2009 | Zakrzewski et al. | 455/418 |
| 2009/0295762 | A1 | * | 12/2009 | Fan et al. | 345/204 |
| 2011/0018854 | A1 | * | 1/2011 | Barclay et al. | 345/211 |

OTHER PUBLICATIONS

"Booting", from Wikipedia, http://en.wikipedia.org/wiki/Booting, downloaded Oct. 2009, pp. 1-11.
Fast Reset:, from OS Group Wiki, downloaded Oct. 2009, pp. 1-7.

* cited by examiner

*Primary Examiner* — Magdi Elhag
(74) *Attorney, Agent, or Firm* — Allen, Dyer, Doppelt, Milbrath & Gilchrist, P.A.

(57) ABSTRACT

A mobile wireless communications device includes a user-visible peripheral, such as a display, and a processor. A reset management block is associated with the processor to manage reset of the device. The processor includes the use of an operating system (OS) which is resettable along with a reset of a state of the user-visible peripheral. The operating system is also resettable without resetting the state of the user-visible peripheral to avoid a user-visible change therein.

14 Claims, 10 Drawing Sheets

ENHANCED FAST RESET IN MOBILE WIRELESS COMMUNICATION DEVICES AND ASSOCIATED METHODS

RELATED APPLICATION

This application is based upon prior filed provisional application Ser. No. 61/253,112 filed Oct. 20, 2009, the entire subject matter of which is incorporated herein by reference in its entirety.

TECHNICAL FIELD

The present invention relates to the field of wireless communications, and, more particularly, to mobile wireless communications devices and related methods.

BACKGROUND

Mobile communications devices, including but not limited to cell phones, have become an integral part of society over the last two decades. The typical mobile communications device may include many integrated circuits (ICs) therein, for example, a processor such as a central processing unit (CPU), a power management circuit, and a graphics processing unit (GPU) driving a display for the device. These mobile devices may run software including operating systems, virtual machines, and various applications that perform desired tasks.

On occasion, a mobile communication device may suffer a serious software error (sometimes called a fatal software error), which can be resolved by a reset operation. In early devices, a user could typically accomplish this reset operation by removing the power supply, i.e. a "battery pull" procedure. To avoid the inconvenience of the battery pull procedure, some manufacturers provided a reset switch that provided similar functionality, and other manufacturers made the reset function accessible via a software command.

A reset operation in which the entire system is reset is often called a "hard reset operation" or a "full reset operation" or a "cold boot operation." Each of the ICs is supplied with power controlled by the power management circuit. When a full reset is performed in the device, the power supplied to each of theses ICs is cycled off and on, thereby resetting all the ICs. A reset operation in which the software or operating system is reset without the hardware being reset may be referred to as a "partial reset" or "warm boot."

BRIEF DESCRIPTION OF THE DRAWINGS

For a better understanding of the various embodiments described herein and to show more clearly how they may be carried into effect, reference will now be made, by way of example only, to the accompanying drawings which show at least one example embodiment and in which.

DETAILED DESCRIPTION

Figure 1:
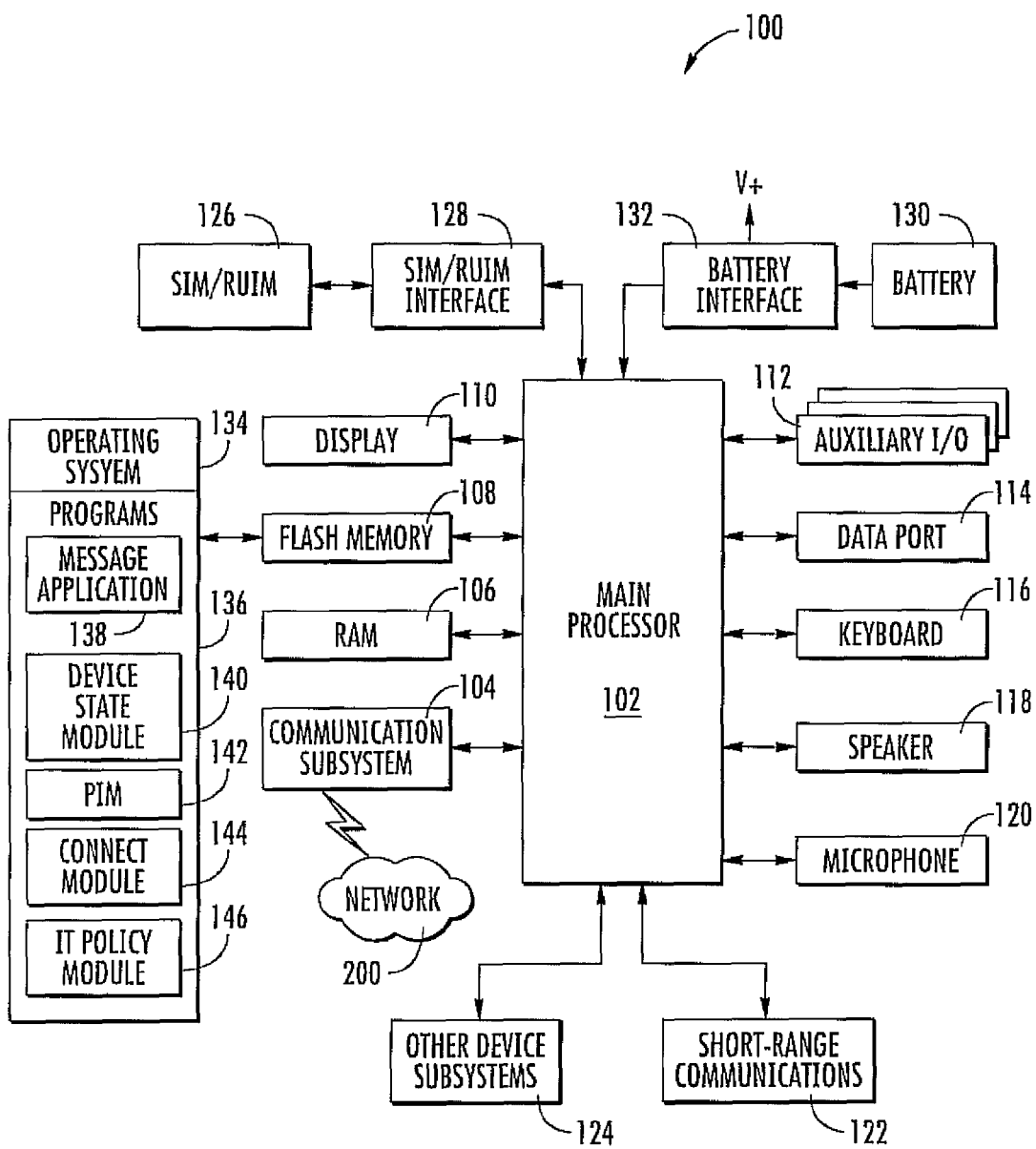
FIG. 1 is a block diagram of an example embodiment of a mobile device.

It will be appreciated that for simplicity and clarity of illustration, where considered appropriate, reference numerals may be repeated among the figures to indicate corresponding or analogous elements. Further, prime and multiple prime notation has been used to denote similar elements in other embodiments. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

Generally speaking, a mobile wireless communications device (also referred to herein as a mobile device) may include wireless communications circuitry, at least one user-visible peripheral, and at least one memory. A processor may cooperate with the wireless communications circuitry, at least user-visible peripheral and the at least one memory in accordance with an operating system (OS). In addition, a reset management block may be configured to cooperate with the processor so that the OS is resettable without resetting a state of the at least one user-visible peripheral to thereby avoid a user-visible change in the at least one user-visible peripheral. This may usefully allow the OS to reset without alerting the user, as such an OS reset may confuse the user, increasing the user's satisfaction with the mobile wireless communications device.

In some applications, the at least one memory may include a non-volatile memory, and the processor may also be configured to run at least one application via a virtual machine. The reset management block may be configured to notify the virtual machine of a reset of the OS and direct temporary storage of application data associated with the at least one application in the non-volatile memory. In addition, the reset management block may be configured to maintain device power until completion of the temporary storage of application data.

The at least one application may be a plurality of applications. Further, the at least one memory may be a volatile memory, the reset management block may be configured to transfer the application data from the non-volatile memory to the volatile memory after the reset of the OS.

The at least one application may include an electronic mail (e-mail) client, and the at least one user-visible peripheral may include a display. The at least one user-visible peripheral may include a keyboard and at least one light associated therewith. Additionally or alternatively, the at least one user-visible peripheral may includes a pointing device and at least one light associated therewith.

The mobile wireless communications device may include a power source and the processor may be configured to maintain power to the at least one user-visible peripheral during a reset. In addition, there may be a clock signal generator configured to generate a clock signal, and the processor may be configured to maintain the clock signal to the at least one user-visible peripheral during a reset.

A method aspect is directed to a method of operating a mobile wireless communications device including wireless communications circuitry, at least one user-visible peripheral, at least one memory, and a processor cooperating with the wireless communications circuitry, at least user-visible peripheral, and the at least one memory in accordance with an operating system (OS). The method may include configuring a reset management block coupled to the processor such that the OS is resettable without resetting a state of the at least one user-visible peripheral to thereby avoid a user-visible change in the at least one user-visible peripheral.

The example embodiments described herein generally relate to a mobile wireless communication device, hereafter referred to as a mobile device, which can be configured according to an IT policy. It should be noted that the term IT policy, in general, refers to a collection of IT policy rules, in which the IT policy rules can be defined as being either grouped or non-grouped and global or per-user. The terms grouped, non-grouped, global and per-user are defined further below. Examples of applicable communication devices include pagers, cellular phones, cellular smart-phones, wireless organizers, personal digital assistants, computers, laptops, handheld wireless communication devices, wirelessly enabled notebook computers and the like.

The mobile device is a two-way communication device with advanced data communication capabilities including the capability to communicate with other mobile devices or computer systems through a network of transceiver stations. The mobile device may also have the capability to allow voice communication. Depending on the functionality provided by the mobile device, it may be referred to as a data messaging device, a two-way pager, a cellular telephone with data messaging capabilities, a wireless Internet appliance, or a data communication device (with or without telephony capabilities). To aid the reader in understanding the structure of the mobile device and how it communicates with other devices and host systems, reference will now be made to FIGS. 1 through 4.

Referring first to FIG. 1, shown therein is a block diagram of an example embodiment mobile device 100 which may be used in example embodiments disclosed herein. The mobile device 100 includes a number of components such as a main processor 102 that controls the overall operation of the mobile device 100. Communication functions, including data and voice communications, are performed through a communication subsystem 104. The communication subsystem 104 receives messages from and sends messages to a wireless network 200. In this example embodiment of the mobile device 100, the communication subsystem 104 is configured in accordance with the Global System for Mobile Communication (GSM) and General Packet Radio Services (CPRS) standards. The GSM/GPRS wireless network is used worldwide and it is expected that these standards will be superseded eventually by Enhanced Data GSM Environment (EDGE) and Universal Mobile Telecommunications Service (UMTS).

New standards are still being defined, but it is believed that they will have similarities to the network behavior described herein, and it will also be understood by persons skilled in the art that the example embodiments described herein are intended to use any other suitable standards that are developed in the future. The wireless link connecting the communication subsystem 104 with the wireless network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 200 associated with mobile device 100 is a GSM/GPRS wireless network in one example implementation, other wireless networks may also be associated with the mobile device 100 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, short-range communications 122 and other device subsystems 124.

Some of the subsystems of the mobile device 100 perform communication-related functions, whereas other subsystems may provide "resident" or on-device functions. By way of example, the display 110 and the keyboard 116 may be used for both communication-related functions, such as entering a text message for transmission over the network 200, and device-resident functions such as a calculator or task list.

The mobile device 100 can send and receive communication signals over the wireless network 200 after required network registration or activation procedures have been completed. Network access is associated with a subscriber or user of the mobile device 100. To identify a subscriber, the mobile device 100 requires a SIM/RUIN card 126 (i.e. Subscriber Identity Module or a Removable User Identity Module) to be inserted into a SIM/RUIN interface 128 in order to communicate with a network. The SIM card or RUIM 126 is one type of a conventional "smart card" that can be used to identify a subscriber of the mobile device 100 and to personalize the mobile device 100, among other things. Without the SIM card 126, the mobile device 100 is not fully operational for communication with the wireless network 200. By inserting the SIM card/RUIM 126 into the SIM/RUIM interface 128, a subscriber can access all subscribed services. Services may include: web browsing and messaging such as e-mail, voice mail, Short Message Service (SMS), and Multimedia Messaging Services (MMS). More advanced services may include: point of sale, field service and sales force automation. The SIM card/RUIM 126 includes a processor and memory for storing information. Once the SIM card/RUIM 126 is inserted into the SIM/RUIM interface 128, it is coupled to the main processor 102.

To identify the subscriber, the SIM card/RUIM 126 can include some user parameters such as an International Mobile Subscriber Identity (IMSI). An advantage of using the SIM card/RUIM 126 is that a subscriber is not necessarily bound by any single physical mobile device. The SIM card/RUIM 126 may store additional subscriber information for a mobile device as well, including datebook (or calendar) information and recent call information. Alternatively, user identification information can also be programmed into the flash memory 108.

The mobile device 100 is a battery-powered device and includes a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the mobile device 100. Although current technology makes use of a battery, future technologies such as micro fuel cells may provide the power to the mobile device 100.

The mobile device 100 also includes an operating system 134 and software components 136 to 146 which are described in more detail below. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, will normally be installed on the mobile device 100 during its manufacture. Other software applications include a message application 138 that can be any suitable software program that allows a user of the mobile device 100 to send and receive electronic messages. Various alternatives exist for the message application 138 as is well known to those skilled in the art. Messages that have been sent or received by the user are typically stored in the flash memory 108 of the mobile device 100 or some other suitable storage element in the mobile device 100. In at least some embodiments, some of the sent and received messages may be stored remotely from the device 100 such as in a data store of an associated host system that the mobile device 100 communicates with.

The software applications can further include a device state module 140, a Personal Information Manager (PIM) 142, and other suitable modules (not shown). The device state module 140 provides persistence, i.e. the device state module 140 ensures that important device data is stored in persistent memory, such as the flash memory 108, so that the data is not lost when the mobile device 100 is turned off or loses power.

The PIM 142 includes functionality for organizing and managing data items of interest to the user, such as, but not limited to, e-mail, contacts, calendar events, voice mails, appointments, and task items. A PIM application has the ability to send and receive data items via the wireless network 200. PIM data items may be seamlessly integrated, synchronized, and updated via the wireless network 200 with the mobile device subscriber's corresponding data items stored and/or associated with a host computer system. This functionality creates a mirrored host computer on the mobile device 100 with respect to such items. This can be particularly advantageous when the host computer system is the mobile device subscriber's office computer system.

The mobile device 100 also includes a connect module 144, and an IT policy module 146. The connect module 144 implements the communication protocols that are required for the mobile device 100 to communicate with the wireless infrastructure and any host system, such as an enterprise system, that the mobile device 100 is authorized to interface with. Examples of a wireless infrastructure and an enterprise system are given in FIGS. 3 and 4, which are described in more detail below.

The connect module 144 includes a set of application programming interfaces (APIs) that can be integrated with the mobile device 100 to allow the mobile device 100 to use any number of services associated with the enterprise system. The connect module 144 allows the mobile device 100 to establish an end-to-end secure, authenticated communication pipe with the host system. A subset of applications for which access is provided by the connect module 144 can be used to pass IT policy commands from the host system to the mobile device 100. This can be done in a wireless or wired manner. These instructions can then be passed to the IT policy module 146 to modify the configuration of the device 100. Alternatively, in some cases, the IT policy update can also be done over a wired connection.

The IT policy module 146 receives IT policy data that encodes the IT policy. The IT policy module 146 then ensures that the IT policy data is authenticated by the mobile device 100. The IT policy data can then be stored in the flash memory 106 in its native form. After the IT policy data is stored, a global notification can be sent by the IT policy module 146 to all of the applications residing on the mobile device 100. Applications for which the IT policy may be applicable then respond by reading the IT policy data to look for IT policy rules that are applicable.

The IT policy module 146 can include a parser (not shown), which can be used by the applications to read the IT policy rules. In some cases, another module or application can provide the parser. Grouped IT policy rules, described in more detail below, are retrieved as byte streams, which are then sent (recursively, in a sense) into the parser to determine the values of each IT policy rule defined within the grouped IT policy rule. In at least some embodiments, the IT policy module 146 can determine which applications are affected by the IT policy data and send a notification to only those applications. In either of these cases, for applications that aren't running at the time of the notification, the applications can call the parser or the IT policy module 146 when they are executed to determine if there are any relevant IT policy rules in the newly received IT policy data.

All applications that support rules in the IT Policy are coded to know the type of data to expect. For example, the value that is set for the "WEP User Name" IT policy rule is known to be a string; therefore the value in the IT policy data that corresponds to this rule is interpreted as a string. As another example, the setting for the "Set Maximum Password Attempts" IT policy rule is known to be an integer, and therefore the value in the IT policy data that corresponds to this rule is interpreted as such.

After the IT policy rules have been applied to the applicable applications or configuration files, the IT policy module 146 sends an acknowledgement back to the host system to indicate that the IT policy data was received and successfully applied.

Other types of software applications can also be installed on the mobile device 100. These software applications can be third party applications, which are added after the manufacture of the mobile device 100. Examples of third party applications include games, calculators, utilities, etc.

The additional applications can be loaded onto the mobile device 100 through at least one of the wireless network 200, the auxiliary I/O subsystem 112, the data port 114, the short-range communications subsystem 122, or any other suitable device subsystem 124. This flexibility in application installation increases the functionality of the mobile device 100 and may provide enhanced on-device functions, communication-related functions, or both. For example, secure communication applications may enable electronic commerce functions and other such financial transactions to be performed using the mobile device 100.

The data port 114 enables a subscriber to set preferences through an external device or software application and extends the capabilities of the mobile device 100 by providing for information or software downloads to the mobile device 100 other than through a wireless communication network. The alternate download path may, for example, be used to load an encryption key onto the mobile device 100 through a direct and thus reliable and trusted connection to provide secure device communication.

The data port 114 can be any suitable port that enables data communication between the mobile device 100 and another computing device. The data port 114 can be a serial or a parallel port. In some instances, the data port 114 can be a USB port that includes data lines for data transfer and a supply line that can provide a charging current to charge the battery 130 of the mobile device 100.

The short-range communications subsystem 122 provides for communication between the mobile device 100 and different systems or devices, without the use of the wireless network 200. For example, the subsystem 122 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download will be processed by the communication subsystem 104 and input to the main processor 102. The main processor 102 will then process the received signal for output to the display 110 or alternatively to the auxiliary I/O subsystem 112. A subscriber may also compose data items, such as e-mail messages, for example, using the keyboard 116 in conjunction with the display 110 and possibly the auxiliary I/O subsystem 112. The auxiliary subsystem 112 may include devices such as: a touch screen, mouse, track ball, infrared fingerprint detector, or a roller wheel with dynamic button pressing capability. The keyboard 116 is preferably an alphanumeric keyboard and/or telephone-type keypad. However, other types of keyboards may also be used. A composed item may be transmitted over the wireless network 200 through the communication subsystem 104.

For voice communications, the overall operation of the mobile device 100 is substantially similar, except that the received signals are output to the speaker 118, and signals for transmission are generated by the microphone 120. Alternative voice or audio I/O subsystems, such as a voice message recording subsystem, can also be implemented on the mobile device 100. Although voice or audio signal output is accomplished primarily through the speaker 118, the display 110 can also be used to provide additional information such as the identity of a calling party, duration of a voice call, or other voice call related information.

Figure 2:
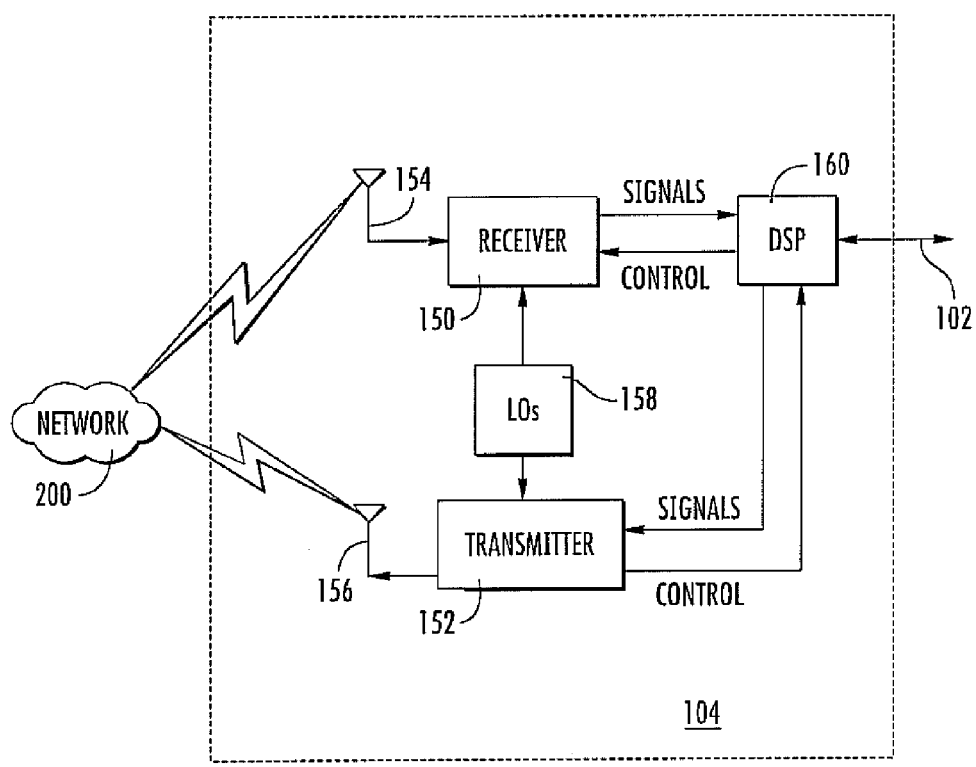
FIG. 2 is a block diagram of an example embodiment of a communication subsystem component of the mobile device of FIG. 1.

Referring now to FIG. 2, an example block diagram of the communication subsystem component 104 is shown. The communication subsystem 104 includes a receiver 150, a transmitter 152, as well as associated components such as one or more embedded or internal antenna elements 154 and 156, Local Oscillators (LOs) 158, and a processing module such as a Digital Signal Processor (DSP) 160. The particular design of the communication subsystem 104 is dependent upon the communication network 200 with which the mobile device 100 is intended to operate. Thus, it should be understood that the design illustrated in FIG. 2 serves only as one example.

Signals received by the antenna 154 through the wireless network 200 are input to the receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in the DSP 160. In a similar manner, signals to be transmitted are processed, including modulation and encoding, by the DSP 160. These DSP-processed signals are input to the transmitter 152 for digital-to-analog (D/A) conversion, frequency up conversion, filtering, amplification and transmission over the wireless network 200 via the antenna 156. The DSP 160 not only processes communication signals, but also provides for receiver and transmitter control. For example, the gains applied to communication signals in the receiver 150 and the transmitter 152 may be adaptively controlled through automatic gain control algorithms implemented in the DSP 160.

The wireless link between the mobile device 100 and the wireless network 200 can contain one or more different channels, typically different RF channels, and associated protocols used between the mobile device 100 and the wireless network 200. An RF channel is a limited resource that must be conserved, typically due to limits in overall bandwidth and limited battery power of the mobile device 100.

When the mobile device 100 is fully operational, the transmitter 152 is typically keyed or turned on only when it is transmitting to the wireless network 200 and is otherwise turned off to conserve resources. Similarly, the receiver 150 is periodically turned off to conserve power until it is needed to receive signals or information (if at all) during designated time periods.

Figure 3:
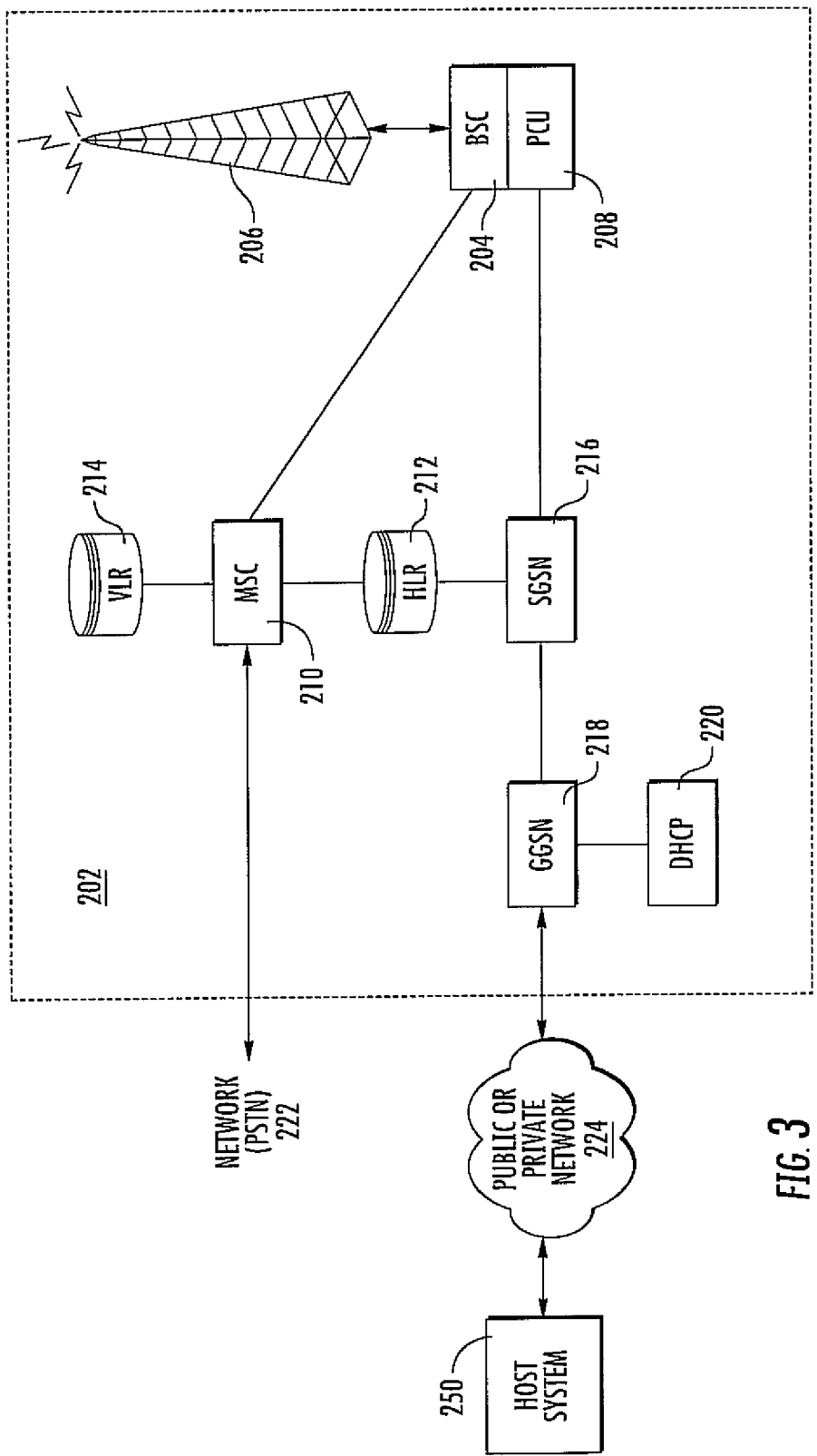
FIG. 3 is an example block diagram of a node of a wireless network.

Referring now to FIG. 3, a block diagram of an example implementation of a node 202 of the wireless network 200 is shown. In practice, the wireless network 200 includes one or more nodes 202. In conjunction with the connect module 144, the mobile device 100 can communicate with the node 202 within the wireless network 200. In the example implementation of FIG. 3, the node 202 is configured in accordance with General Packet Radio Service (GPRS) and Global Systems for Mobile (GSM) technologies. The node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through the network 200.

In a GSM network, the MSC 210 is coupled to the BSC 204 and to a landline network, such as a Public Switched Telephone Network (PSTN) 222 to satisfy circuit switched requirements. The connection through the PCU 208, the SGSN 216 and the GGSN 218 to a public or private network (Internet) 224 (also referred to herein generally as a shared network infrastructure) represents the data path for GPRS capable mobile devices. In a GSM network extended with GPRS capabilities, the BSC 204 also contains the Packet Control Unit (PCU) 208 that connects to the SGSN 216 to control segmentation, radio channel allocation and to satisfy packet switched requirements. To track the location of the mobile device 100 and availability for both circuit switched and packet switched management, the HLR 212 is shared between the MSC 210 and the SGSN 216. Access to the VLR 214 is controlled by the MSC 210.

The station 206 is a fixed transceiver station and together with the BSC 204 form fixed transceiver equipment. The fixed transceiver equipment provides wireless network coverage for a particular coverage area commonly referred to as a "cell". The fixed transceiver equipment transmits communication signals to and receives communication signals from mobile devices within its cell via the station 206. The fixed transceiver equipment normally performs such functions as modulation and possibly encoding and/or encryption of signals to be transmitted to the mobile device 100 in accordance with particular, usually predetermined, communication protocols and parameters, under control of its controller. The fixed transceiver equipment similarly demodulates and possibly decodes and decrypts, if necessary, any communication signals received from the mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a user profile is stored in the HLR 212. The HLR 212 also contains location information for each registered mobile device and can be queried to determine the current location of a mobile device. The MSC 210 is responsible for a group of location areas and stores the data of the mobile devices currently in its area of responsibility in the VLR 214. Further, the VLR 214 also contains information on mobile devices that are visiting other networks. The information in the VLR 214 includes part of the permanent mobile device data transmitted from the HLR 212 to the VLR 214 for faster access. By moving additional information from a remote HLR 212 node to the VLR 214, the amount of traffic between these nodes can be reduced so that voice and data services can be provided with faster response times and at the same time requiring less use of computing resources.

The SGSN 216 and the GGSN 218 are elements added for GPRS support; namely packet switched data support, within GSM. The SGSN 216 and the MSC 210 have similar responsibilities within the wireless network 200 by keeping track of the location of each mobile device 100. The SGSN 216 also performs security functions and access control for data traffic on the wireless network 200. The GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring the DHCP server 220 connected to the GGSN 218. There are many mechanisms for dynamic IP assignment, including using a combination of a Remote Authentication Dial-In User Service (RADIUS) server and a DHCP server. Once the GPRS Attach is complete, a logical connection is established from a mobile device 100, through the PCU 208, and the SGSN 216 to an Access Point Node (APN) within the GGSN 218. The APN represents a logical end of an IP tunnel that can either access direct Internet compatible services or private network connections. The APN also represents a security mechanism for the network 200, insofar as each mobile device 100 must be assigned to one or more APNs and mobile devices 100 cannot exchange data without first performing a GPRS Attach to an APN that it has been authorized to use. The APN may be considered to be similar to an Internet domain name such as "myconnection.wireless.com".

Once the GPRS Attach operation is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 200. To maximize use of the PDP Contexts, the network 200 will run an idle timer for each PDP Context to determine if there is a lack of activity. When a mobile device 100 is not using its POP Context, the PDP Context can be de-allocated and the IP address returned to the IP address pool managed by the DHCP server 220.

Figure 4:
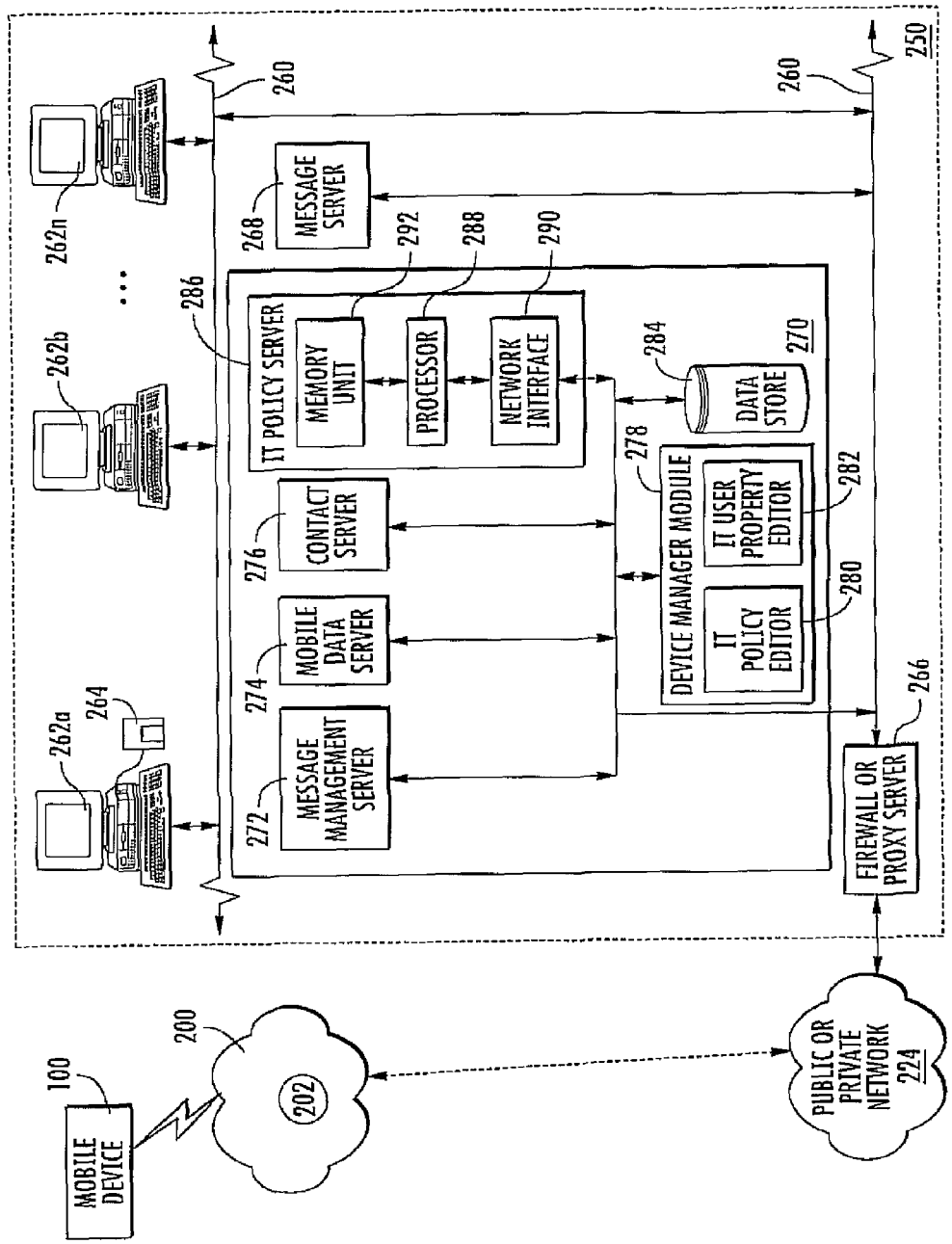
FIG. 4 is a block diagram illustrating components of a host system in one example configuration for use with the wireless network of FIG. 3 and the mobile wireless communications device of FIG. 1.

Referring now to FIG. 4, shown therein is a block diagram illustrating components of an example configuration of a host system 250 that the mobile device 100 can communicate with in conjunction with the connect module 144. The host system 250 will typically be a corporate enterprise or other local area network (LAN), but may also be a home office computer or some other private system, for example, in variant implementations. In this example shown in FIG. 4, the host system 250 is depicted as a LAN of an organization to which a user of the mobile device 100 belongs. Typically, a plurality of mobile devices can communicate wirelessly with the host system 250 through one or more nodes 202 of the wireless network 200.

The host system 250 includes a number of network components connected to each other by a network 260. For instance, a user's desktop computer 262a with an accompanying cradle 264 for the user's mobile device 100 is situated on a LAN connection. The cradle 264 for the mobile device 100 can be coupled to the computer 262a by a serial or a Universal Serial Bus (USB) connection, for example. Other user computers 262b-262n are also situated on the network 260, and each may or may not be equipped with an accompanying cradle 264. The cradle 264 facilitates the loading of information (e.g. PIM data, private symmetric encryption keys to facilitate secure communications) from the user computer 262a to the mobile device 100, and may be particularly useful for bulk information updates often performed in initializing the mobile device 100 for use. The information downloaded to the mobile device 100 may include certificates used in the exchange of messages.

It will be understood by persons skilled in the art that the user computers 262a-262n will typically also be connected to other peripheral devices, such as printers, etc. which are not explicitly shown in FIG. 4. Furthermore, only a subset of network components of the host system 250 are shown in FIG. 4 for ease of exposition, and it will be understood by persons skilled in the art that the host system 250 will include additional components that are not explicitly shown in FIG. 4 for this example configuration. More generally, the host system 250 may represent a smaller part of a larger network (not shown) of the organization, and may include different components and/or be arranged in different topologies than that shown in the example embodiment of FIG. 4.

To facilitate the operation of the mobile device 100 and the wireless communication of messages and message-related data between the mobile device 100 and components of the host system 250, a number of wireless communication support components 270 can be provided. In some implementations, the wireless communication support components 270 can include a message management server 272, a mobile data server 274, a contact server 276, and a device manager module 278. The device manager module 278 includes an IT Policy editor 280 and an IT user property editor 282, as well as other software components for allowing an IT administrator to configure the mobile devices 100. In an alternative embodiment, there may be one editor that provides the functionality of both the IT policy editor 280 and the IT user property editor 282. The support components 270 also include a data store 284, and an IT policy server 286. The IT policy server 286 includes a processor 288, a network interface 290 and a memory unit 292. The processor 288 controls the operation of the IT policy server 286 and executes functions related to the standardized IT policy as described below. The network interface 290 allows the IT policy server 286 to communicate with the various components of the host system 250 and the mobile devices 100. The memory unit 292 can store functions used in implementing the IT policy as well as related data. Those skilled in the art know how to implement these various components. Other components may also be included as is well known to those skilled in the art. Further, in some implementations, the data store 284 can be part of any one of the servers.

In this example embodiment, the mobile device 100 communicates with the host system 250 through node 202 of the wireless network 200 and a shared network infrastructure 224 such as a service provider network or the public Internet. Access to the host system 250 may be provided through one or more routers (not shown), and computing devices of the host system 250 may operate from behind a firewall or proxy server 266. The proxy server 266 provides a secure node and a wireless internet gateway for the host system 250. The proxy server 266 intelligently routes data to the correct destination server within the host system 250.

In some implementations, the host system 250 can include a wireless VPN router (not shown) to facilitate data exchange between the host system 250 and the mobile device 100. The wireless VPN router allows a VPN connection to be established directly through a specific wireless network to the mobile device 100. The wireless VPN router can be used with the Internet Protocol (IP) Version 6 (IPV6) and IP-based wireless networks. This protocol can provide enough IP addresses so that each mobile device has a dedicated IP address, making it possible to push information to a mobile device at any time. An advantage of using a wireless VPN router is that it can be an off-the-shelf VPN component, and does not require a separate wireless gateway and separate wireless infrastructure. A VPN connection can preferably be a Transmission Control Protocol (TCP)/IP or User Datagram Protocol (UDP)/IP connection for delivering the messages directly to the mobile device 100 in this alternative implementation.

Messages intended for a user of the mobile device 100 are initially received by a message server 268 of the host system 250. Such messages may originate from any number of sources. For instance, a message may have been sent by a sender from the computer 262b within the host system 250, from a different mobile device (not shown) connected to the wireless network 200 or a different wireless network, or from a different computing device, or other device capable of sending messages, via the shared network infrastructure 224, possibly through an application service provider (ASP) or Internet service provider (ISP), for example.

The message server 268 typically acts as the primary interface for the exchange of messages, particularly e-mail messages, within the organization and over the shared network infrastructure 224. Each user in the organization that has been set up to send and receive messages is typically associated with a user account managed by the message server 268. Some example implementations of the message server 268 include a Microsoft Exchange™ server, a Lotus Domino™ server, a Novell Groupwise™ server, or another suitable mail server installed in a corporate environment. In some implementations, the host system 250 may include multiple message servers 268. The message server 268 may also be adapted to provide additional functions beyond message management, including the management of data associated with calendars and task lists, for example.

When messages are received by the message server 268, they are typically stored in a data store associated with the message server 268. In at least some embodiments, the data store may be a separate hardware unit, such as data store 284, that the message server 268 communicates with. Messages can be subsequently retrieved and delivered to users by accessing the message server 268. For instance, an e-mail client application operating on a user's computer 262a may request the e-mail messages associated with that user's account stored on the data store associated with the message server 268. These messages are then retrieved from the data store and stored locally on the computer 262a. The data store associated with the message server 268 can store copies of each message that is locally stored on the mobile device 100. Alternatively, the data store associated with the message server 268 can store all of the messages for the user of the mobile device 100 and only a smaller number of messages can be stored on the mobile device 100 to conserve memory. For instance, the most recent messages (i.e. those received in the past two to three months for example) can be stored on the mobile device 100.

When operating the mobile device 100, the user may wish to have e-mail messages retrieved for delivery to the mobile device 100. The message application 138 operating on the mobile device 100 may also request messages associated with the user's account from the message server 268. The message application 138 may be configured (either by the user or by an administrator, possibly in accordance with an organization's information technology (IT) policy) to make this request at the direction of the user, at some pre-defined time interval, or upon the occurrence of some pre-defined event. In some implementations, the mobile device 100 is assigned its own e-mail address, and messages addressed specifically to the mobile device 100 are automatically redirected to the mobile device 100 as they are received by the message server 268.

The message management server 272 can be used to specifically provide support for the management of messages, such as e-mail messages, that are to be handled by mobile devices. Generally, while messages are still stored on the message server 268, the message management server 272 can be used to control when, if, and how messages are sent to the mobile device 100. The message management server 272 also facilitates the handling of messages composed on the mobile device 100, which are sent to the message server 268 for subsequent delivery.

For example, the message management server 272 may monitor the user's "mailbox" (e.g. the message store associated with the user's account on the message server 268) for new e-mail messages, and apply user-definable filters to new messages to determine if and how the messages are relayed to the user's mobile device 100. The message management server 272 may also compress and encrypt new messages (e.g. using an encryption technique such as Data Encryption Standard (DES), Triple DES, or Advanced Encryption Standard (AES)) and push them to the mobile device 100 via the shared network infrastructure 224 and the wireless network 200. The message management server 272 may also receive messages composed on the mobile device 100 (e.g. encrypted using Triple DES), decrypt and decompress the composed messages, re-format the composed messages if desired so that they will appear to have originated from the user's computer 262*a*, and re-route the composed messages to the message server 268 for delivery.

Certain properties or restrictions associated with messages that are to be sent from and/or received by the mobile device 100 can be defined (e.g. by an administrator in accordance with IT policy) and enforced by the message management server 272. These may include whether the mobile device 100 may receive encrypted and/or signed messages, minimum encryption key sizes, whether outgoing messages must be encrypted and/or signed, and whether copies of all secure messages sent from the mobile device 100 are to be sent to a pre-defined copy address, for example.

The message management server 272 may also be adapted to provide other control functions, such as only pushing certain message information or pre-defined portions (e.g. "blocks") of a message stored on the message server 268 to the mobile device 100. For example, in some cases, when a message is initially retrieved by the mobile device 100 from the message server 268, the message management server 272 may push only the first part of a message to the mobile device 100, with the part being of a pre-defined size (e.g. 2 KB). The user can then request that more of the message be delivered in similar-sized blocks by the message management server 272 to the mobile device 100, possibly up to a maximum pre-defined message size. Accordingly, the message management server 272 facilitates better control over the type of data and the amount of data that is communicated to the mobile device 100, and can help to minimize potential waste of bandwidth or other resources.

The mobile data server 274 encompasses any other server that stores information that is relevant to the corporation. The mobile data server 274 may include, but is not limited to, databases, online data document repositories, customer relationship management (CRM) systems, or enterprise resource planning (ERP) applications.

The contact server 276 can provide information for a list of contacts for the user in a similar fashion as the address book on the mobile device 100. Accordingly, for a given contact, the contact server 276 can include the name, phone number, work address and e-mail address of the contact, among other information. The contact server 276 can also provide a global address list that contains the contact information for all of the contacts associated with the host system 250.

It will be understood by persons skilled in the art that the message management server 272, the mobile data server 274, the contact server 276, the device manager module 278, the data store 284 and the IT policy server 286 do not need to be implemented on separate physical servers within the host system 250. For example, some or all of the functions associated with the message management server 272 may be integrated with the message server 268, or some other server in the host system 250. Alternatively, the host system 250 may include multiple message management servers 272, particularly in variant implementations where a large number of mobile devices need to be supported.

Alternatively, in some embodiments, the IT policy server 286 can provide the IT policy editor 280, the IT user property editor 282 and the data store 284. In some cases, the IT policy server 286 can also provide the device manager module 278. The processor 288 of the IT policy server 286 can be used to perform the various steps of a method for providing IT policy data that is customizable on a per-user basis as explained further below and in conjunction with FIGS. 5 to 8. The processor 288 can execute the editors 280 and 282. In some cases, the functionality of the editors 280 and 282 can be provided by a single editor. In some cases, the memory unit 292 can provide the data store 284.

The device manager module 278 provides an IT administrator with a graphical user interface with which the IT administrator interacts to configure various settings for the mobile devices 100. As mentioned, the IT administrator can use IT policy rules to define behaviors of certain applications on the mobile device 100 that are permitted such as phone, web browser or Instant Messenger use. The IT policy rules can also be used to set specific values for configuration settings that an organization requires on the mobile devices 100 such as auto signature text, WLAN/VoIP/VPN configuration, security requirements (e.g. encryption algorithms, password rules, etc.), specifying themes or applications that are allowed to run on the mobile device 100, and the like.

In some cases, a mobile wireless communications device may not need a hard or full reset. Rather than resetting all or most of the systems, it may be desirable instead to reset one or a few subsystems. Perhaps, only the CPU needs to be reset, for example. In such cases, a partial reset may be performed. Positively, the partial reset feature may provide a mobile wireless communications device reset that is shorter in duration than a hard/full reset. A potential drawback to the partial reset of the CPU may be that other subsystems that do not need to be reset are adversely affected. Resetting a CPU, for example, may cause all of the CPU output pins to return to their default values. A return to the defaults values typically includes resetting the GPU, thereby causing the display to be changed, for example, the display may flicker or blank out.

As described below, a processor, such as a CPU, may be resettable along with the GPU, and the processor also may be partially resettable without resetting the GPU. When the processor is reset without resetting the GPU, a change in the display of the device can be avoided. This concept will be described in the context of a mobile wireless communications device, which may include a display, and a GPU. The GPU is resettable and an undesirable change in the output of the display occurs, such as a flickering or a blanking, when the display is reset. The mobile wireless communications device also includes a wireless transceiver, and a processor cooperating with the GPU and the wireless transceiver for wireless communications. The processor may be resettable along with the GPU, and the processor also may be partially resettable without resetting the GPU to avoid a change in the display.

Figure 5:
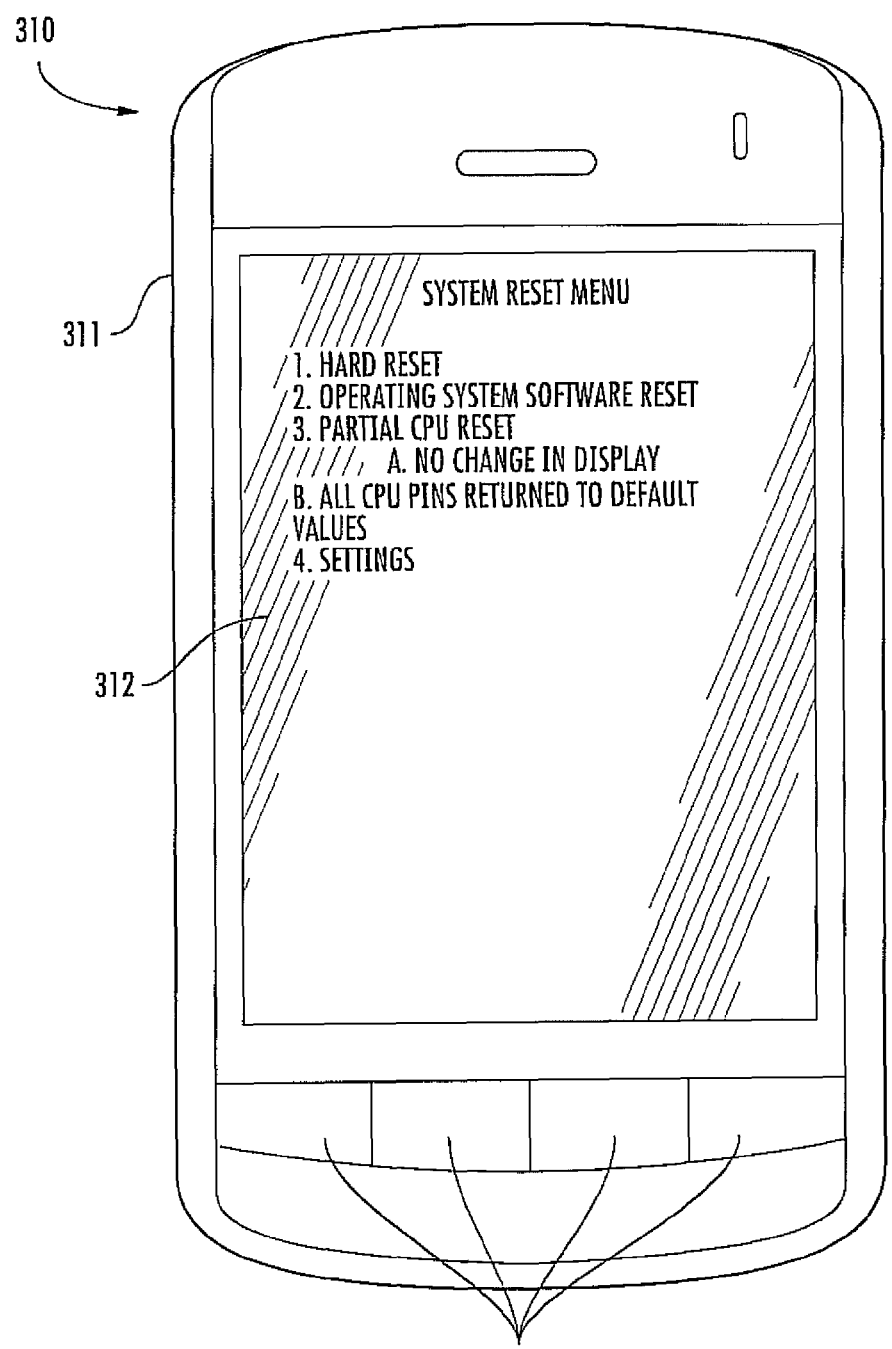
FIG. 5 is a front view of an example embodiment of a mobile wireless communications device according to the present disclosure.
Figure 6:
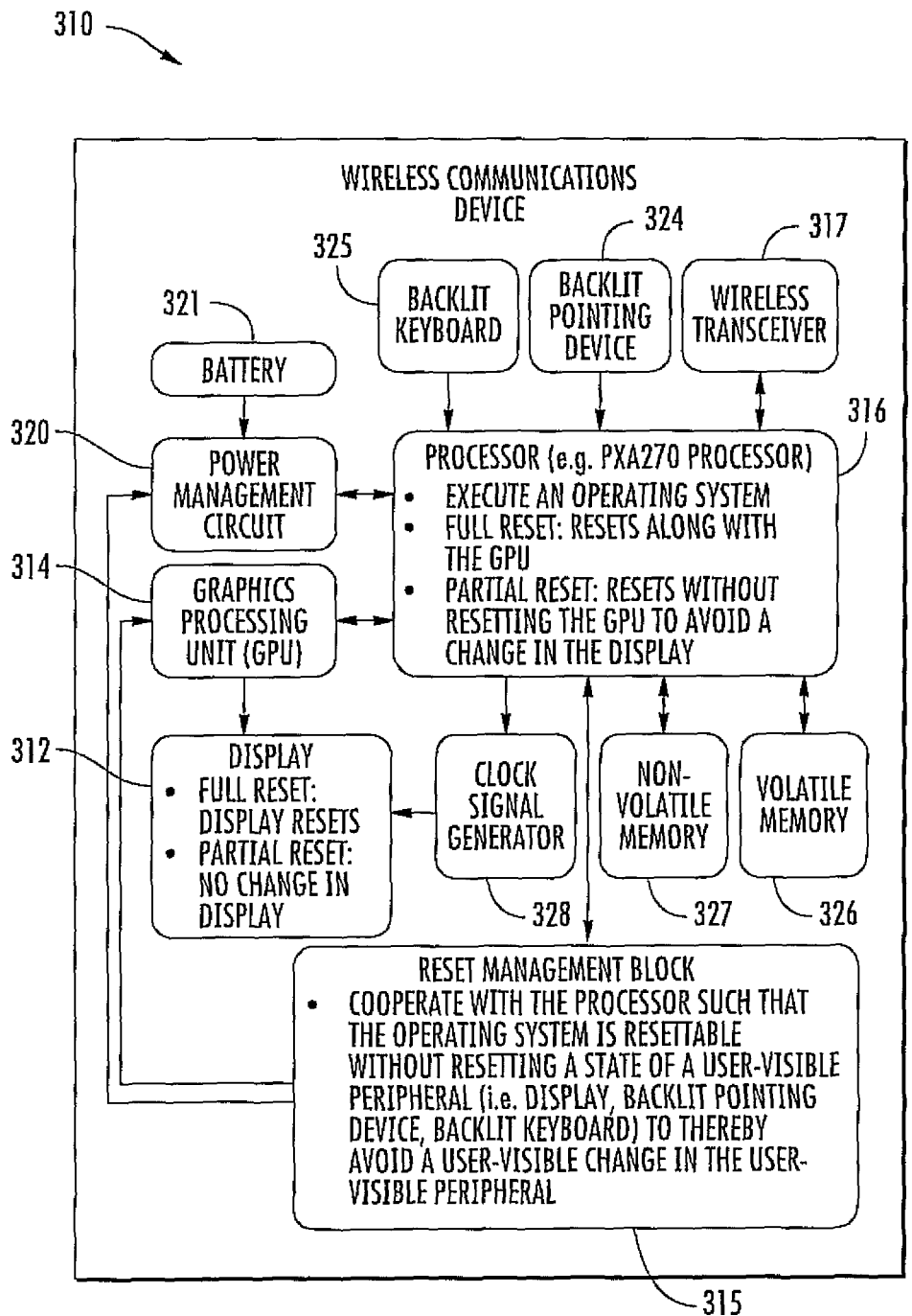
FIG. 6 is a schematic block diagram of the mobile wireless communications device of FIG. 5.

Referring now to FIGS. 5 and 6, a mobile wireless communications device 310 illustratively includes a display 312, and a graphics processing unit (GPU) 314 cooperating therewith to provide a graphical user interface to a user. The mobile wireless communications device 310 illustratively includes a power management circuit 320 coupled to the processor 316, and a rechargeable power source, illustrated as a battery 321. The battery 321 is illustratively coupled to the power management circuit 320. A clock signal generator 328 is controlled by the processor 316 and is coupled to the display 312 to provide a clock signal thereto. The display 312 operates based upon the clock signal. Non-volatile memory 327 and volatile memory 326 are coupled to the processor 316. A wireless transceiver 317 is coupled to the processor 316 and performs at least one wireless communications function. A backlit keyboard 325 and a backlit pointing device 324 are coupled to the processor and facilitate user input.

The display 312 may include, for example, a transmissive thin film transistor liquid crystal display (LCD). The processor 316 may include, for example, a Marvell Tavor PV processor, as available from Marvell Semiconductor, Inc. of Santa Clara, Calif. In certain example embodiments, the wireless transceiver 317 may include a transceiver for a radio communications technology, for example, a Global System for Mobile communications (GSM), a code division multiple access (CDMA), and/or a Universal Mobile Telecommunications System Wideband Code Division Multiple Access (UMTS W-CDMA).

Also, the mobile wireless communication device 310 illustratively includes a housing 311 carrying the display 312, the GPU 314, the wireless transceiver 317, the battery 321, the power management circuit 320, the processor 316, the backlit pointing device 324, the backlit keyboard 325, the volatile memory 326, the non-volatile memory 327, and the clock signal generator 328. The mobile wireless communications device 310 illustratively includes a plurality of switches 313a-313d affixed to an outer surface of the housing 311.

Further, the mobile wireless communications device 310 further illustratively includes a reset management block 315, which may be a logic circuit, coupled between the processor 316 and the GPU 314, and between the power management circuit 320 and the GPU. As will be appreciated by those skilled in the art, the mobile wireless communications device 310 includes a plurality of power lines (power rails) providing power to each of the integrated circuits (ICs).

During operation, the processor 316 cooperates with the GPU 314 and the wireless transceiver 317 for wireless communications and other mobile wireless functions, for example, GPS navigation and Internet applications. Also, as may be desirable during certain operations, the processor 316 may reset the GPU 314, thereby causing a change in the display 312 when reset, i.e. a flickering or blanking of the display. The processor 316 is resettable along with the GPU 314. More particularly, during a hard/full reset procedure, the power management circuit 320 may disable the power lines to all IC circuits, causing each IC circuit to reset, i.e. the power management circuit shuts down power to the GPU 314 and the processor 316, and a reset procedure is required upon the subsequent power up.

The processor 316 executes an operating system, and the reset management block 315 cooperates with the processor such that the operating system is resettable without resetting a state of a user-visible peripheral (i.e. display 312, backlit pointing device 324, or backlit keyboard 325) to thereby avoid a user-visible change.

It is useful that the processor 316 may be partially resettable without resetting the GPU 314. In other words, the processor 316 may access a command to reset itself without disruption of power supply from the power management circuit 320 to any of the other IC circuits. In some example embodiments, the processor 316 may access a command to reset itself automatically without a command from the user (e.g. this may be referred to as a software assertion). Further to this point, during the partial reset operation of the processor 316, the power management circuit 320 maintains power to the GPO 314 and the processor 316. Nonetheless, during the partial reset operation of the processor 316, the processor returns all pin outputs to default values. For example, the GPU reset output pin would return to a default low value, which in the typical device would reset the GPO and display and may be described as high or low, but this is for convenience of explanation, and the concepts described herein are not necessarily limited to particular logical values.

In this mobile wireless communications device 310, the GPU reset signal received from the GPU reset output pin of the processor 316 is fed into the reset management block 315. The power management circuit 320 illustratively provides a GPU reset hold signal, which is also input in the reset management block 315. The output of the reset management block 315 is coupled to a reset pin of the GPU 314 and provides a reset control signal. It is useful that during the partial reset operation of the processor 316, the logic circuit 315 maintains the output to a high value even though the GPU reset signal from the processor goes to a low value, thereby preventing the GPU 314 and display 312 from resetting, i.e. this avoids any flickering or blanking of the display during the partial reset. It is noted that the power management circuit 320 itself does not reset, thus its reset-hold signal is kept across the GPU's reset.

In some example embodiments, the reset management block 315 may include a logic circuit including an OR gate. More particularly, the OR gate may receive the GPU reset signal from the processor 316 and the GPU reset hold signal from the power management circuit 320. During the partial reset operation, the processor 316 GPU reset signal goes to a low value and is OR'ed with the GPU reset hold signal of the power management circuit 320, for example, the power management IC General Purpose Input/Output (PMIC GPIO) signal. During the partial reset, the power management circuit 320 PMIC GPIO signal remains at a high value and keeps the output of the OR gate, i.e. the reset control signal, also at a high value, thereby preventing the GPU 314 and display 312 from resetting and disrupting the user experience. It should be noted that the state of any other ICs that may result in a user-visible change (e.g. keyboard backlighting etc.) may be held and prevented from resetting. Indeed, in the mobile wireless communications device 310, the processor 316 may perform a partial reset without the user even noticing.

Figures 7, 8:
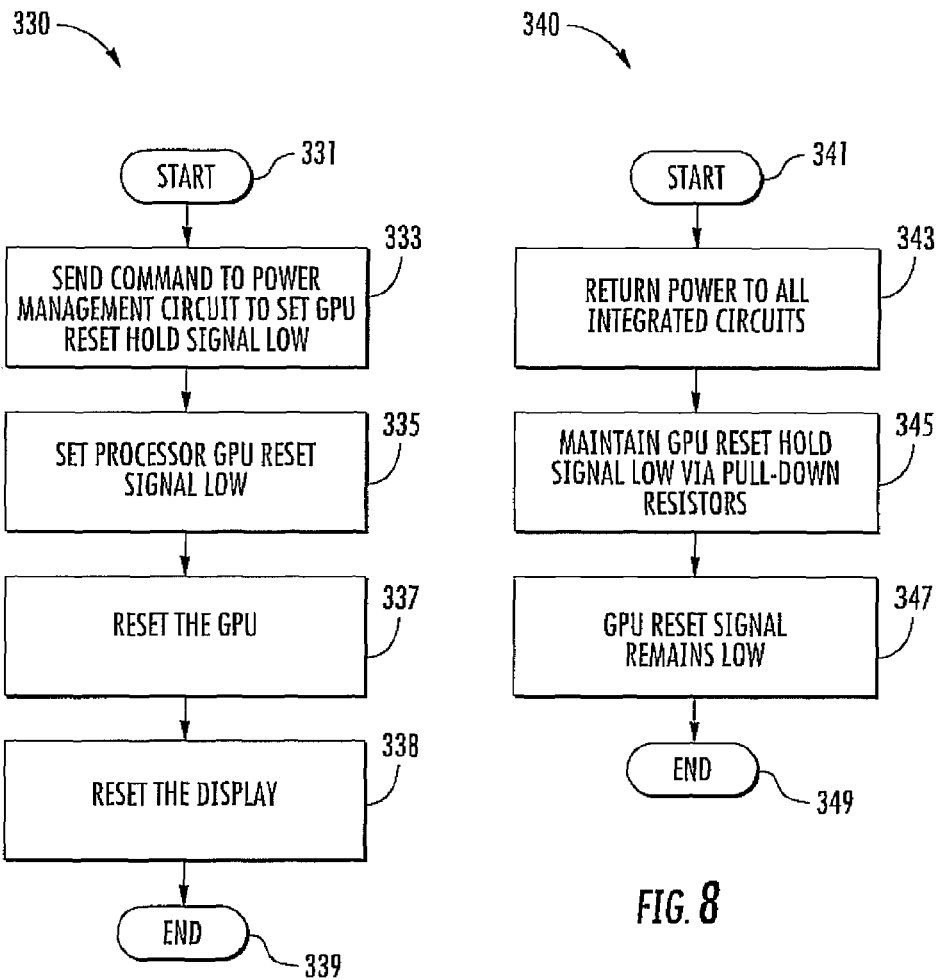
FIG. 7 is a flowchart illustrating operation of the mobile wireless communications device of FIG. 5.
FIG. 8 is another flowchart illustrating operation of the mobile wireless communications device of FIG. 5.

FIG. 7 is a flowchart of an example embodiment method 330. In situations where it may be desirable to force a GPU 314 and display 312 reset, the processor 316 begins at Block 331 and sends the power management circuit 320 a command to bring the GPU reset hold signal to a low value. (Block 333). As will be appreciated by those skilled in the art, the processor 316 and the power management circuit 320 communicate using a multi-master serial computer bus based upon, for example, an inter-integrated circuit ($I^2C$) standard. Of course, as will be appreciated by those skilled in the art, other communication standards may be used. The processor 316 sets the GPU reset signal to a low value, which now brings the reset control signal to a low value also, thereby resetting the GPU 314 and the display 312. (Blocks 335, 337, & 338). At 339, method 330 ends.

FIG. 8 is a flowchart of an example embodiment method 340. In this example embodiment, the mobile wireless communications device 310 may include a pair of pull-down resistors (for example, 300 k$\Omega$) coupled to the OR gate. In particular, one pull-down resistor (FIG. 5) is coupled to PMIC GPIO signal and the other pull-down resistor is coupled to the output of the OR gate. This usefully maintains the reset control signal at a low value during a power-up operation of the mobile wireless communications device 310. More specifically, as will be appreciated by those skilled in the art, it is desirable to maintain the display 312 in a reset state during the power-up operation, which begins at Block 341. At power-up, (Block 343), the PMIC GPIO signal is by default in an unconfigured state and the processor 316 GPU reset signal goes to a low value by default. Accordingly, the first pull-down resistor maintains the respective input of the OR gate at a low value, therefore keeping the reset control signal low during the power-up operation (Block 345). A power up in this context is a complete on/off switch, a hard reset will power down most ICs, and a soft reset will power down the processor 316 and a few others only.

Furthermore, the second pull-down resistor (FIG. 9) coupled to the output of the OR gate is used to maintain the output at a low value during the power-up operation. More particularly, the time period of concern is prior to 1.8 Volt power application to the OR gate. In other words, the second pull-down resistor keeps the OR gate output at a low value when the OR gate is not powered (Blocks 347 & 349). Of course, if the OR gate can maintain a low while being without power, then the second pull-down resistor may be omitted.

Figure 9:
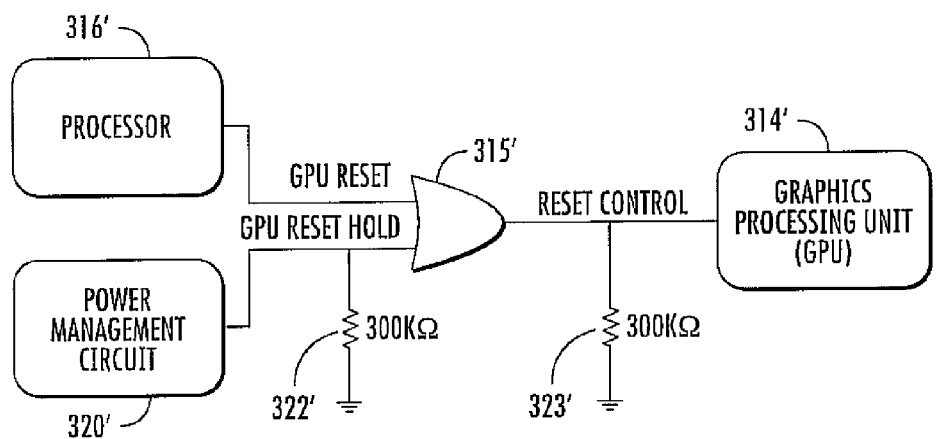
FIG. 9 is a schematic circuit diagram of a portion of the mobile wireless communications device of FIG. 5.

Referring now to FIG. 9, another example embodiment of the mobile wireless communications device 310' is now described. In this embodiment of the mobile wireless communications device 310', those elements already discussed above with respect to FIGS. 5 and 6 are given prime notation and most require no further discussion herein. This embodiment differs from the previous example embodiment in that the reset management block of the mobile wireless communications device 310' further comprise an OR gate 315' receiving the GPU reset and the GPU reset hold signals and outputting the reset control signal to the GPU. Further, as discussed herein above, the mobile wireless communications device 310' further includes a pair of pull-down resistors 322'-323'.

Another aspect is directed to a method for making a mobile wireless communications device 310. The method may include coupling a GPU 314 to a display 312, the GPU being resettable and causing a change in the display when reset, and coupling a processor 316 to the GPU and a wireless transceiver 317 for wireless communications. The processor 316 may be resettable along with the GPU 314, and the processor also may be partially resettable without resetting the GPU to avoid a change in the display 312.

The mobile wireless communications device 310 described hereinabove is useful over the typical mobile wireless communications device. For example, mobile wireless communications device 310 experiences shorter reboot times and provides a more desirable user experience during a partial reset operation since the display 312 does not flicker or reset during aforesaid partial reset operations. Indeed, the user may be unaware that the mobile wireless communications device 310 has performed a Fast Reset method, as disclosed herein.

Figure 10:
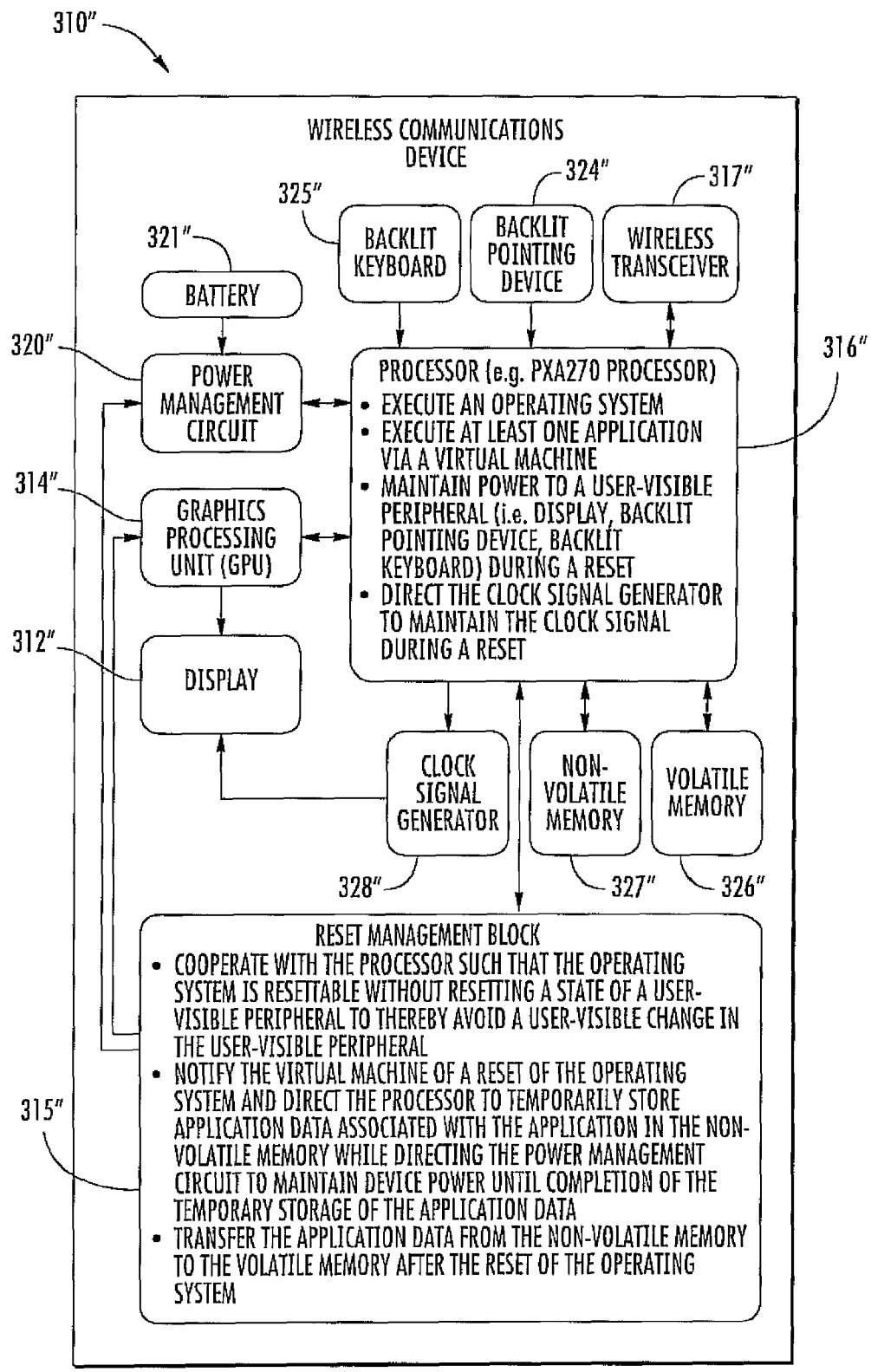
FIG. 10 is a schematic block diagram illustrating operational characteristics of an example embodiment of the mobile wireless communications device of FIG. 5.

Either separately/independently from or in conjunction with one or more of the operations and components discussed above, a mobile device can be configured as shown in FIG. 10 to improve operations associated with resetting the mobile device. As discussed above, a reset operation in which the entire system is reset is often called a "hard reset operation" or a "full reset operation" or a "cold boot operation." When a full reset is performed in the device, the power supplied to the processor is cycled off and on, thereby resetting the processor. A reset operation in which the software or operating system is reset without the hardware being reset may be referred to as a "partial reset" or "warm boot."

Illustratively, FIG. 10 depicts a wireless communications device 310" similar to that described above (indeed, elements of the wireless communications device 310" not specifically described are similar to those of the mobile wireless communications device 310 described above with reference to FIGS. 5-6). Here, the volatile memory 326" may be random access memory (RAM), and the nonvolatile memory 327" may be read only memory (ROM), Flash memory, a magnetic RAM, etc. The wireless communications device 310" could also have other memory devices, such as intelligent random access memory (TRAM).

The processor 316" executes various software routines, including an operating system and a virtual machine (such as a Java virtual machine (JVM), in an example embodiment). Additionally, one or more user application modules may execute on the virtual machine. The user application modules may include such applications as electronic mail (e-mail) clients, scheduling applications, text entry, or other applications that can allow a user to create, send, receive, or manipulate electronic data.

The processor 316" is coupled to a reset management block 315", and is configured to maintain power to a user-visible peripheral during a device reset. Moreover, the processor 316" directs the clock signal generator 328" to maintain the clock signal to the display 312" during a reset, helping prevent the display from flickering.

The wireless communications device 310" can be configured to handle software operations associated with a reset thereof. The reset management block 315" can be used to receive notification of a reset on the mobile device. The reset management block 315" can then notify one or more applications (e.g., user application code or the virtual machine) of the impending reset and can assign non-volatile memory 327" to the application. The reset management block 315" can retain power until an application has its volatile memory contents (e.g., data used by the application during the application's execution) transferred to the assigned memory block. The reset management block 315" accomplishes this by directing the power management circuit 320" to maintain device power until completion of the temporary storage of the application data in the non-volatile memory 327".

The reset management block 315" can transfer the stored volatile memory contents back to volatile memory 326" for use by the application (e.g., during the application's execution) based upon the wireless communications device 310" receiving a startup request, or after a reset of the operating system.

A software-initiated reset will typically occur when the mobile device receives an unexpected input and is unable to handle it. The software-initiated reset may be prompted by the JVM, OS, or a test application under non-catastrophic conditions or under catastrophic failure.

There are two types of software-initiated resets, soft reset and hard reset. A soft reset does not reset any hardware. It restarts the OS by executing the OS at the beginning of OS image. The data in RAM is not lost during this type of reset. However, it is up to the OS to decide to reuse those data or to overwrite the RAM area. RAM reuse is tied to faster bootup times. Basically the number of modules that need not be reinitialized is related to faster boot times.

A hard reset behaves the same as power off reset. Instead of pulling off the battery, it pins the hardware reset line on the board. A soft reset typically runs faster than a hard reset. The implementation may be varied on each platform, depending on hardware limitations. Some defined conditions are used to determine if the device resets by soft reset or hard reset. Also, if the software assertion is critical enough that post-soft-reset integrity checks are predicted to fail, then a hard reset is performed. A Fast Reset method as disclosed herein is only allowed during soft reset in an example embodiment.

Most resets are software-initiated, except hardware resets, watchdog timer (WDT) resets when interrupts are disabled, and Power-on-reset (POR) which is a complete loss of power. Note that a when a mobile device is powered off (using the power key), power may not actually be removed from the CPU. Instead, the device may go into a deep sleep state where current consumption is minimal, without even resetting the CPU. This is why a mobile device may seem to turn on instantly once the power key is pressed again.

To address the slow cold-boot time, especially during early development stages where self-initiated resets are frequent, Fast Reset methods and apparatus as disclosed herein were developed. As used herein, a Fast Reset or warm boot is a software reset that maintains the state of the hardware, including values stored in RAM. During OS and Radio bootup, both cold and warm, the executing context for most processes, in RAM, is reset to defaults. Other specially marked areas of RAM are not re-initialized or touched during the boot sequence and as a result will survive a warm-boot. Note that care may be taken when using data from these RAM areas, as a hardware failure (e.g. power loss glitch) or a software failure (e.g. bad pointer) can cause data corruption. These areas contain context information for specific application processes (i.e. JVM) and/or modules which are eligible for a warm restart, through which a sizeable portion of their reinitialization sequence is skipped. Once the OS/Radio has completed its bootup process, cold and warm, all OS APIs are reset to their initial state.

During startup, the JVM queries the OS on whether the device is coming up from a warm-boot. If the OS indicates that the device is coming up from a cold-boot, or if the JVM tests fail, all existing RAM context is wiped out and the JVM starts from scratch. In this case, any pre-reset user data (e.g. an email being composed) is lost. If the OS indicates a warm-boot, the JVM runs internal checks on its preserved RAM areas and Java process contexts. Once these tests pass, the last Java thread context is loaded and the JVM starts executing where it left off. Thus, if the end user was composing a large email in the compose window, the same window will appear and no text will have been lost.

A warm-boot can lead to an out-of-sync scenario between Java Applications and the OS, as the JVM starts executing where it left off, and the OS API is completely reset. In order to handle this, the JVM provides an object-oriented Listener interface to notify applications on a Fast Reset. In the JVM's warm-boot case, avoiding the startup time of the Java Applications that would have occurred on a cold-boot can yield significant time savings. As would be appreciated by those skilled in the art, a JVM is a set of computer software programs and data structures that use a virtual machine model for the execution of other computer programs and scripts. The model used by a JVM accepts a form of computer intermediate language commonly referred to as Java bytecode. This language conceptually represents the instruction set of a stack-oriented, capability architecture. The JVM is distributed along with a set of standard class libraries that implement the Java API (Application Programming Interface).

A Fast Reset as disclosed herein is not guaranteed in certain example embodiments. If the JVM was executing bytecode when it reset, a Fast Reset method cannot proceed, as thread context could be corrupted. Thus, the JVM may take the following steps on bootup. If the OS disallows fast reset, execute a full reset. If the JVM state disallows Fast Reset, execute a full reset. Execute memory sanity check, etc., and if any problem is found, execute a full reset. Execute a Fast Reset and if something goes wrong during the execution of the Fast Reset, execute the next reset as a full reset.

Once a Fast Reset method is complete, the JVM posts a Fast Reset message to the applications, which in turn causes a repaint message to get sent to the foreground process (this may be sent to all processes instead). There are cases where the JVM is directly controlling what's being shown on the display and a Fast Reset may not be allowed in any of these states. A usefulness of Fast Reset is to avoid the startup time of the Java Applications that would have occurred on a cold-boot. When a Java Application initiates a reset, it means the application encountered a failure. In this scenario, Fast Reset may not be allowed.

A Fast Reset will appear to the user as a short device hang, followed by a period, e.g. 5 seconds, of LED on/LCD off before the LCD turns on again with the same pre-reset image and Java continues exactly where it was. In most cases the only negative side effect is a few missed keystrokes.

Enhanced Fast Reset is a feature where the state of the user-visible peripherals are kept throughout a Fast Reset, from the point the CPU reboots, through the warm boot phase until control is handed back the JVM. As used herein, user-visible peripherals may include, for example, the display and device backlights such as trackball and keyboard backlights. Externally, the device would appear as if it just hung for a few seconds. The features for this Enhanced Fast Reset are as follows: the LCD panel is placed in self refresh mode before the reset; keyboard and LCD backlights retain their state; power, clocks, and reset are maintained to all peripherals that need to maintain state, where applicable; the JVM indicates to the OS when a Fast Reset has failed; if the Fast Reset fails, the device reverts to a cold boot; during the warm boot sequence, where the device is unresponsive, an overlay, e.g. an hourglass, may be overlayed on top of the LCD image; USB current draw limits are met if the device is plugged in; bootrom dependencies are kept to a minimum.

Figure 11:
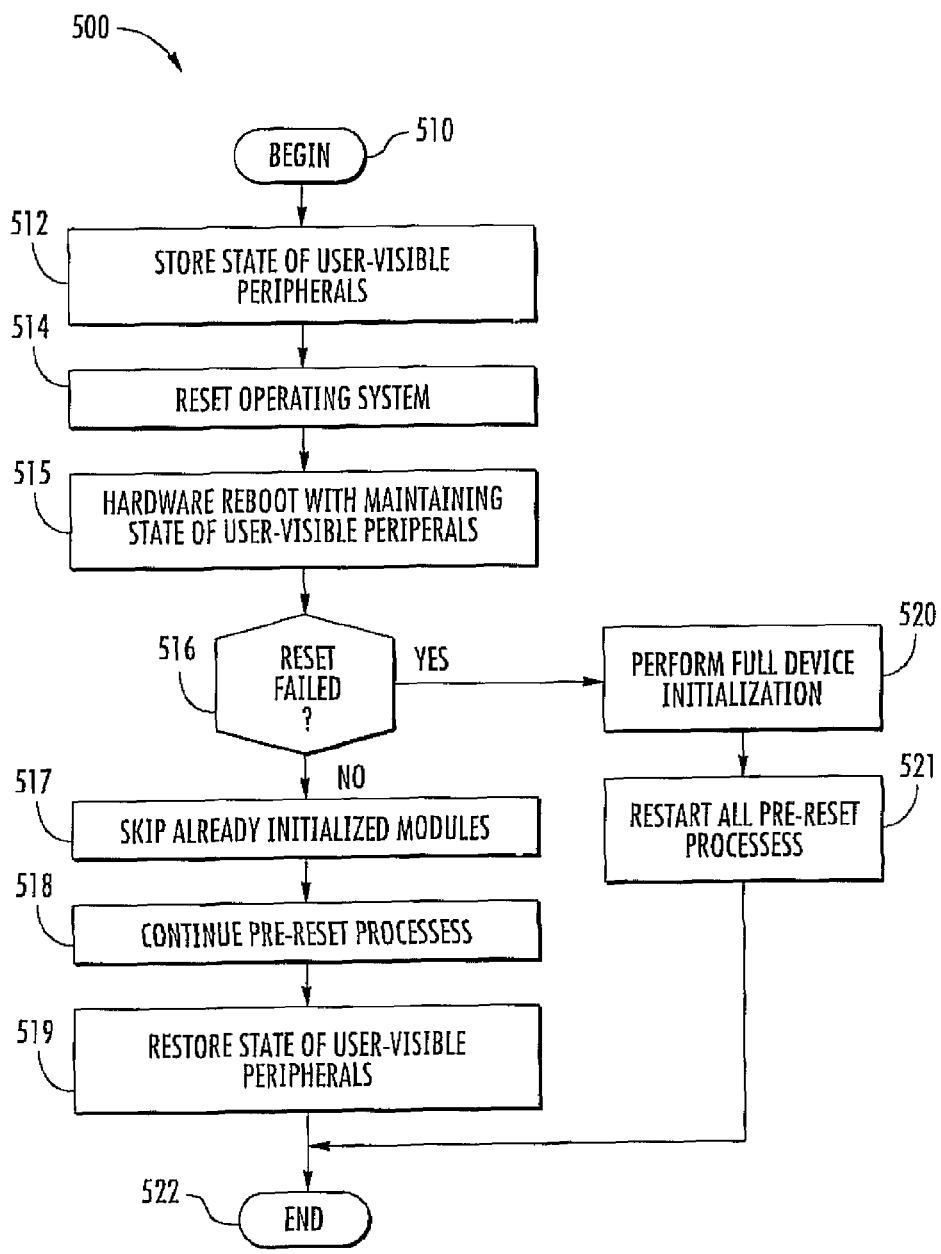
FIG. 11 is another flowchart illustrating operation of the mobile wireless communications device of FIG. 5.

FIG. 11 is a flowchart of an example embodiment method 500. The method begins (Block 510) and includes, at Block 512, storing the state of user-visible peripherals (e.g. the display, keyboard backlights etc.). The OS is reset at Block 514, and the hardware reboot is performed while maintaining the state of the user-visible peripherals, Block 515. Then it is determined whether the reset failed, at Block 516. If the reset did not fail, then software modules that are already initialized are skipped, Block 517, and the processes running prior to the reset are continued, Block 518. At Block 519, the state of user-visible peripherals is restored. If the Enhanced Fast Reset failed (Block 516), then a full device initialization is performed (Block 520) before restarting all pre-reset processes, Block 521. The method ends at Block 522.

Enhanced Fast Reset example cases are described below. During a successful Fast Reset (from initiated soft reset), an hourglass is overlayed on the LCD, backlights are kept, device resets, image is retained, bootrom executes and hands control back to OS, OS refrains from resetting LCD, control is handed over to JVM, JVM indicates a Fast Reset, JVM clears hourglass, repaint message is sent to all Java processes. For an unsuccessful Fast Reset (from initiated soft reset), an hourglass is overlayed on the LCD, backlights are kept, device resets, image is retained, bootrom executes and hands control back to OS, OS refrains from resetting LCD, control is handed over to JVM, but JVM was not idle when device reset, JVM indicates a Full Reset, OS clears the LCD image and reverts to normal startup screen.

A Per-task reset may also be possible and would let the system restart any single task (or group of tasks). This will help reduce the number of system resets, by restarting only the portion of the system that is in trouble.

The main features for a warm-boot are: to keep power and RAM interface signals intact across a system-wide reset, thus guaranteeing data preservation; to provide deterministic hardware indication of whether a cold or warm boot was performed; to reset most peripherals other than RAM and CPU (in the absence of a reset, power-cycling them); and to avoid resetting the LCD, LED, and backlights (so that there's no external indication of a reset to the user); to provide deterministic indication of a power loss (e.g. battery pull) even if just momentarily (as this power loss may corrupt RAM).

During the course of operation of the mobile device, some use cases may require overwriting the RAM area occupied by JVM data. In these cases, even if a warm-boot was performed and RAM power and signals were kept intact, the OS may indicate to the JVM that a cold-boot is required.

FIGS. 1 and 10 illustrate example embodiment mobile device architectures. Architectures for mobile devices can vary based upon the desire to implement certain functional features, such as making a mobile device capable of handling both voice and data communications. The fact that other components are not depicted in the figures or discussed is in no way intended to limit the systems and methods disclosed herein or imply that other components cannot be included or the components shown cannot be excluded as part of the architecture of the example systems and methods. Correspondingly, one or more methods and systems disclosed herein may operate with fewer components than what is depicted in FIGS. 1 and 10 depending upon the functionality needed for the application at hand.

The steps or operations in the flow charts described herein are example embodiments. There may be many variations to these steps or operations without departing from the spirit of the invention. For instance, the steps may be performed in a differing order, or steps may be added, deleted, or modified.

Many modifications and other example embodiments will come to the mind of one skilled in the art having the benefit of the teachings presented in the foregoing descriptions and the associated drawings. Therefore, it is understood that various modifications and example embodiments are intended to be included within the scope of the appended claims.

That which is claimed is:

1. A mobile wireless communications device comprising:
a wireless transceiver;
a keyboard and a user-visible light associated therewith;
a non-volatile memory;
a clock signal generator configured to generate a clock signal; and
a processor cooperating with the wireless transceiver to perform at least one wireless communications function, and cooperating with the keyboard, the user-visible light, the non-volatile memory, and the clock signal generator in accordance with an operating system (OS), and configured to
reset the OS without resetting a state of the keyboard and the user-visible light to avoid a user-visible change in the keyboard and the user-visible light,
run at least one application via a virtual machine,
notify the virtual machine of a reset of the OS and direct temporary storage of application data associated with the at least one application in the non-volatile memory, and
maintain the clock signal to the keyboard and the user-visible light during the reset.

2. The mobile wireless communications device according to claim 1, wherein the processor is configured to maintain device power until completion of the temporary storage of application data.

3. The mobile wireless communications device according to claim 1, wherein the at least one application includes a plurality of applications.

4. The mobile wireless communications device according to claim 1, further comprising a volatile memory; and wherein the processor is configured to transfer the application data from the non-volatile memory to the volatile memory after the reset of the OS.

5. The mobile wireless communications device according to claim 1, wherein the at least one application comprises an electronic mail (e-mail) client.

6. The mobile wireless communications device according to claim 1, further comprising a display coupled to the processor; and wherein the processor is configured to reset the OS without resetting a state of the display.

7. The mobile wireless communications device according to claim 1, further comprising a power source; and wherein the processor is configured to maintain power to the keyboard and the user-visible light during a reset.

8. A mobile wireless communications device comprising:
a display;
a wireless transceiver;
a keyboard and a user-visible light associated therewith;
a non-volatile memory;
a clock signal generator configured to generate a clock signal; and
a processor cooperating with the wireless transceiver to perform at least one wireless communications function, and cooperating with the display, the keyboard, the user-visible light, the non-volatile memory, and the clock signal generator in accordance with an operating system (OS), and configured to
reset the OS without resetting a state of the display, the keyboard, and the user-visible light,
run at least one application via a virtual machine,
notify the virtual machine of a reset of the OS and direct temporary storage of application data associated with the at least one application in the non-volatile memory, and
maintain the clock signal to the display, the keyboard, and the user-visible light during the reset.

9. The mobile wireless communications device according to claim 8, wherein the processor is configured to maintain device power until completion of the temporary storage of application data.

10. The mobile wireless communications device according to claim 8, further comprising at least one volatile memory; and wherein the processor is configured to transfer the application data from the non-volatile memory to the volatile memory after the reset of the OS.

11. A method of operating a mobile wireless communications device including a wireless transceiver, a keyboard, a user-visible light associated with the keyboard, a clock signal generator configured to generate a clock signal, and a processor cooperating with the wireless transceiver to perform a wireless communications function, and cooperating with the keyboard and the user-visible light in accordance with an operating system (OS), the method comprising:
resetting the OS without resetting a state of the keyboard and the user-visible light to avoid a user-visible change in the user-visible light;
running, using the processor, at least one application module via a virtual machine;
configuring the processor to notify the virtual machine of a reset the OS and directing temporary storage of application data associated with the at least one application in a non-volatile memory; and maintaining the clock signal to the keyboard and the user-visible light during a reset.

12. The method according to claim 11, wherein the processor maintains device power until completion of the temporary storage of application data.

13. The method according to claim 11, further comprising configuring the processor to transfer the application data from the non-volatile memory to a volatile memory after the reset of the OS.

14. The method according to claim 11, wherein the mobile wireless communications device further comprises a power source; and further comprising configuring the processor to maintain power to the keyboard and the user-visible light during a reset.

* * * * *